United States Patent [19]

Sugiyama et al.

[11] Patent Number: 5,114,882

[45] Date of Patent: May 19, 1992

[54] FILTER FOR ALUMINUM HOT MELT HAVING A PARTIALLY CRYSTALLINE BINDER

[75] Inventors: Takashi Sugiyama, Kagamihara; Osamu Yamakawa; Akira Sumiya, both of Kani, all of Japan

[73] Assignees: NGK Insulators, Ltd.; NGK Adrec Co., Ltd., Japan

[21] Appl. No.: 660,851

[22] Filed: Feb. 26, 1991

[30] Foreign Application Priority Data

Mar. 2, 1990 [JP] Japan .................................. 2-52184

[51] Int. Cl.⁵ .......................... C03C 14/00; C03C 8/14
[52] U.S. Cl. ........................................ 501/17; 501/32; 210/510.1
[58] Field of Search .................. 210/510.1; 501/32, 80, 501/81, 39, 52, 17

[56] References Cited

U.S. PATENT DOCUMENTS 3,524,548 8/1970 McDonald et al. ............. 210/510.1
4,510,253 4/1985 Felice et al. ................. 210/510.1 X
4,528,099 7/1985 Rieger et al. ................. 210/510.1 X Primary Examiner—William R. Dixon, Jr.
Assistant Examiner—Lisa M. Schull
Attorney, Agent, or Firm—Parkhurst, Wendel & Rossi

[57] ABSTRACT

A filter for aluminum hot melt comprises alumina aggregate particles and an inorganic binder in an amount of 5 to 20 parts by weight bound to 100 parts by weight of said alumina aggregate particles. The inorganic binder is composed to 15 wt % to 80 wt % of $B_2O_3$, 2 wt % to 60 wt % of $Al_2O_3$, 0 wt % to 30 wt % of CaO and 5 wt % to 50 wt % of MgO, and the presence of a highly crystalline binder in the filter yields better properties such as an increase in chemical durability and a lower thermal expansion coefficient where the crystallinity is defined by a peak height of $9Al_2O_3 \cdot 2B_2O_3$ at $2\theta = 16.5°$ being not less than 30% of a peak-height of $\alpha\text{-}Al_2O_3$ at $2\theta = 43.4°$ when measured by powder X-ray diffractometry and is obtained by a cooling rate of less than 70° C./hr.

5 Claims, 1 Drawing Sheet

FILTER FOR ALUMINUM HOT MELT HAVING A PARTIALLY CRYSTALLINE BINDER

BACKGROUND OF THE INVENTION

1. Field of the Invention

The present invention relates to a filter for aluminum hot melt which filtrates solid impurities contained in aluminum hot melt. More particularly, the present invention relates to a ceramic filter and an improvement of an inorganic binder which is used for binding aggregate particles.

2. Description of the Related Art

Aluminum sheet or foil has previously been produced by rolling an ingot into which aluminum hot melt is cast. If the ingot is contaminated by solid impurities, such as minute fragments of metal oxides or refractories contained in the aluminum hot melt, pinholes or surface defects may arise in the sheet or foil during the rolling of the ingot when manufacturing such products. The prevention of these defects requires the removal of the solid impurities contained in the hot melt. Accordingly, conventional means, for example, a porous ceramic cylindrical filter, have been used. This filter for aluminum hot melt has been produced in such a way that aggregate particles of such materials as silicon carbide, silicon nitride, and alumina are mixed up with inorganic binding raw material, and the resulting material is formed into a cylindrical shape, heated to a predetermined temperature, and subsequently cooled. Such a production method provides a porous ceramic having numerous minute consecutive pores formed between aggregate particles which are bound to each other by a vitreous inorganic binder.

In such a porous ceramic, silica-based glass is employed as an inorganic binder which binds aggregate particles. Accordingly, $SiO_2$ contained in the inorganic binder reacts with the aluminum hot melt to generate free silicon which will contaminate the hot melt. This resulting contamination of the aluminum hot melt causes cracking and other defects during the rolling of an aluminum ingot. Such contamination means that the aluminum hot melt will erode the inorganic binder. Therefore, after long term use, the strength of the filter decreases, with the result that the life thereof is shortened.

SUMMARY OF THE INVENTION

Accordingly, the object of the invention is to provide a filter for an aluminum hot melt which can prevent contamination of the hot melt, and can be highly corrosion-resistant as well. A filter for an aluminum hot melt comprises alumina aggregate particles and an inorganic binder in an amount of 5 to 20 parts by weight bound to 100 parts by weight of the alumina aggregate particles, the inorganic binder being composed of 15 wt % to 80 wt %, preferably 30 wt % to 70 wt % of $B_2O_3$, 2 wt % to 60 wt %, preferably 10 wt % to 45 wt % of $Al_2O_3$, 0 wt % to 30 wt %, preferably 0 wt % to 25 wt % of CaO and 5 wt % to 50 wt %, preferably 5 wt % to 25 wt % of MgO, and a peak-height of $9Al_2O_3 \cdot 2B_2O_3$ at $2\theta = 16.5°$ being not less than 30%, preferably not less than 35% of a peak-height of $\alpha$-$Al_2O_3$ at $2\theta = 43.4°$ when measured by powder X-ray diffractometry ($CuK\alpha$).

In the filter for aluminum hot melt, according to this invention, the inorganic binder does not contain $SiO_2$ and is crystallized, the absence of $SiO_2$ thereby preventing contamination of the hot melt by free silicon which causes erosion of the inorganic binder. Also, the peak-height of $9Al_2O_3 \cdot 2B_2O_3$ at $2\theta = 16.5°$ is not less than 30% of that of $\alpha$-$Al_2O_3$ at $2\theta = 43.4°$ when measured by powder X-ray diffractometry ($CuK\alpha$), that is, the inorganic binder is highly crystallized. Accordingly, this inorganic binder is highly corrosion-resistant against aluminum hot melt in comparison with other inorganic binders having low crystallinity or high vitrification; consequently, the filter can be used for a longer period. The relationship between crystallinity of the inorganic binder and corrosion-resistance of the filter can be derived from measuring the residual strength of a variety of filters which have various degrees of crystallinity after dipping in aluminum hot melt. For instance, the filters were tested for their respective residual strength after 24 hours of dipping in aluminum alloy 5056 and the results are shown in FIG. 1. It is understood that if crystallinity is not less than 30%, residual strength, namely, durability after dipping, would be sufficiently high. Therefore, the peak-height of $9Al_2O_3 \cdot 2B_2O_3$ at $2\theta = 16.5°$ should not be less than 30% of the peak-height of $\alpha$-$Al_2O_3$ at $2\theta = 43.4°$.

The aggregate particles of the filter in this invention are made of alumina which has excellent wettability to aluminum hot melt, and thus aluminum hot melt readily passes through pores between the aggregate particles; therefore, the filter shows outstanding filtering efficiency. The inorganic binder is crystallized as mentioned above, and hence decreases thermal expansion of the entire filter in comparison with the conventional filter employing a vitreous inorganic binder; accordingly, cracking or breakage resulting from thermal stress can be prevented and the life of the filter can be prolonged physically.

The reasons for specifying composition of the inorganic binder within the ranges described above are as follows.

Not less than 15 wt % of $B_2O_3$ content in the filter is necessary for increasing corrosion-resistance to aluminum hot melt, whereas not more than 80 wt % of $B_2O_3$ content therein is needed for increasing melting temperature of the filter to a suitable degree. The ranges of 2 wt % to 60 wt % of $Al_2O_3$, 0 wt % to 30 wt % of CaO and 5 wt % to 50 wt % of MgO are specified mainly for limiting melting temperature of the filter within an appropriate range, and particularly, exceeding upper limits of such ranges requires to increase melting temperature excessively thereby resulting in a trouble of splattering of $B_2O_3$. The inorganic binder may be added to the aggregate particles in either form of unprocessed raw material or fritted raw material, and the latter form is preferable to attain a homogeneous melting state during heating thereby accelerating crystallization.

Further, the reason for limiting the amount of the inorganic binder to 5 to 20 parts by weight of the aggregate particles is as follows.

If the binder is less than 5 parts by weight, the relative amount of the aggregate particles will increase. Therefore, the thermal expansion of the aggregates will excessively contribute to entire thermal expansion of the filter. If the binder is more than 20 parts by weight, the binder is liable to fill spaces between the aggregate particles, leading to decrease of filtering efficiency.

Suitable additional amount of the inorganic binder varies within the above-mentioned range, depending upon the sizes of alumina aggregate particles. Both electromelting alumina and sintered alumina may be employed as alumina aggregate particles.

As mentioned above, $SiO_2$ is not contained in the inorganic binder bound to the aggregate particles and such inorganic binder is highly crystallized in this invention; therefore, contamination by free silicon and erosion of the inorganic binder can be prevented. Also, the aggregate particles employed in this invention are made of alumina which is excellent in wettability to aluminum hot melt, and hence the filter has excellent filtering efficiency. Furthermore, crystallization of the inorganic binder can decrease the entire thermal expansivity of the filter during use in comparison with conventional filter for aluminium hot melt.

Accordingly, cracking and breakage resulted from thermal stress can be prevented and durability of the filter is improved.

DESCRIPTION OF THE PREFERRED EMBODIMENTS

Figure 1:
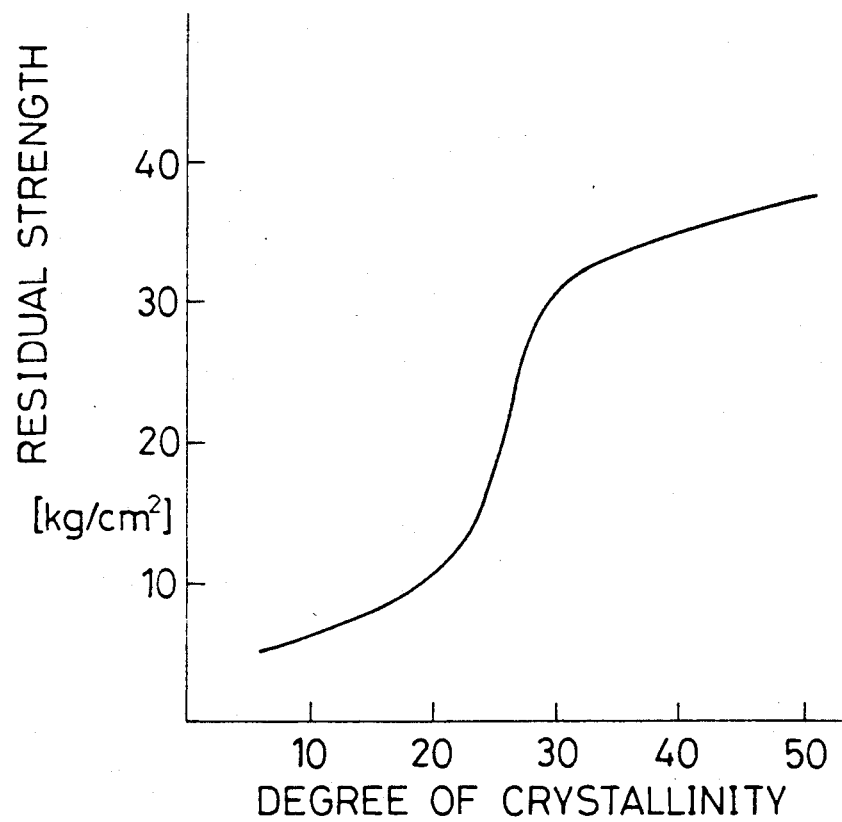
FIG. 1 is a graph illustrating the relationship between crystallinity of inorganic binder and residual strength of filter dipped in aluminum hot melt.

The following examples are given to further illustrate the invention.

The sintered alumina of 14 to 28 mesh is adopted as aggregate particles in all Examples and Comparative Examples. Inorganic binders were added to aggregate particles according to composition indicated in each table and then mixed up with aggregate particles, organic binder and water. Next, the resulting mixture was molded into several forms such as cylindrical shape, and then was dried, and subsequently sintered at 1300° C. After sintering, external appearance of the sintered product was observed and the bending strength thereof was measured. The filter was broken into particles, and the degree of crystallinity (%) of crystallized $9Al_2O_3 \cdot 2B_2O_3$ was measured by powder X-ray diffractometry. A peak-height $H_A$ of $9\ Al_2O_3 \cdot 2B_2O_3$ at $2\theta = 16.5°$ and a peak-height $H_B$ of $\alpha\text{-}Al_2O_3$ at $2\theta = 43.4°$ were measured by powder X-ray diffractometry (CuKα), and thus crystallinity was defined as $(H_A/H_B) \times 100$.

EXAMPLES 1 to 5 AND COMPARATIVE EXAMPLES 1 to 2

These examples were different in composition of inorganic binders but the same in other conditions. Compositions of inorganic binders in Examples 1 to 5 were within the scope of the invention and compositions of Comparative Examples 1 to 2 were beyond the scope of the invention. Each composition and evaluation were indicated in Table 1.

In comparative Example 1 where mixing ratio of $B_2O_3$ was excessively low and in Comparative Example 2 where such ratio was excessively high, the crystallinity of binders was low, and consequently, the anticorrosion was low.

Also, the bending strength of the filter was low in such examples. On the other hand, in Examples where compositions of inorganic binders were specified within the prescribed ranges, the crystallinity of the binders attained not less than 30 wt %, and therefore, the anticorrosion was high and the bending strength was also sufficient.

EXAMPLES 6 to 8 and Comparative Examples 3 to 4

These examples were different in mixing ratio of inorganic binders to aggregate particles. Such mixing ratios in Examples 6 to 8 were within the scope of the invention, and mixing ratios in Comparative Examples 3 to 4 were beyond the scope of the invention. Compositions of the inorganic binders and evaluations were given in Table 2. When the mixing ratio of inorganic binders to 100 parts by weight of aggregate particles was excessively low, bending strength would decrease to 30 kg/cm². When it was excessively high, clogging of the filter occurred; therefore, the characteristic property of the filter was impaired. In Examples 6 to 8 where the mixing ratios were within the scope of the invention, on the other hand, 55 kg/cm² of bending strength was obtained and clogging of such filter did not occur.

EXAMPLES 9 to 12

These examples were different in cooling speeds from melting state of binders during sintering. Example 12 showed a cooling speed of 80° C./hr; however, in Examples 9 to 11, the cooling speeds were not more than 70° C./hr. Compositions of the binders and evaluation of filter were given in Table 3. In Example 12, it is revealed that the degree of crystallinity came to 25 wt % finally thereby somewhat decreasing anticorrosion. On the other hand, in Examples 9 to 11 where cooling speed was not more than 70° C./hr, it is revealed that sufficient degree of crystallinity was obtained; accordingly, excellent anticorrosion was attained. When cooling speed was 25° C./hr (Example 9), sufficient degree of crystallinity was obtained; however, long cooling period was needed thereby resulting in low productivity.

TABLE 1

|  |  | Examples |  |  |  |  | Comp. Examp. |  |
|---|---|---|---|---|---|---|---|---|
|  |  | 1 | 2 | 3 | 4 | 5 | 1 | 2 |
| Inorganic binding materials | Composition (%) $B_2O_3$ | 45 | 45 | 45 | 30 | 70 | 10 | 85 |
|  | $Al_2O_3$ | 30 | 30 | 25 | 45 | 10 | 35 | 10 |
|  | CaO | 15 | 0 | 25 | 15 | 10 | 25 | 0 |
|  | MgO | 10 | 25 | 5 | 10 | 10 | 30 | 5 |
|  | Addition amount (%) | 15 | 15 | 15 | 15 | 15 | 15 | 15 |
|  | Form | frit | frit | frit | frit | frit | frit | frit |
| Cooling speed (°C./hr) |  | 50 | 50 | 50 | 50 | 50 | 50 | 50 |
| Evaluation | Crystallization (%) | 65 | 85 | 50 | 55 | 60 | 20 | 25 |
|  | Appearance | c | c | c | c | c | ∘ | x |
|  | Bending Strength (kg/cm²) | 65 | 70 | 65 | 55 | 50 | 35 | 45 |
|  | Total Evaluation | c | c | c | c | c | c | x |

Appearance, Total Evaluation
c : good
Δ: average
x: not good

TABLE 2

|  |  | Examples |  |  | Comp. Examp. |  |
|---|---|---|---|---|---|---|
|  |  | 6 | 7 | 8 | 3 | 4 |
| Inorganic binding materials | Composition (%) $B_2O_3$ | 45 | 45 | 45 | 45 | 45 |
|  | $Al_2O_3$ | 30 | 30 | 30 | 30 | 30 |
|  | CaO | 15 | 15 | 15 | 15 | 15 |
|  | MgO | 10 | 10 | 10 | 10 | 10 |
|  | Addition amount (%) | 5 | 10 | 15 | 3 | 25 |
|  | Form | frit | frit | original form | frit | frit |

TABLE 2-continued

|  |  | Examples | | | Comp. Examp. | |
|---|---|---|---|---|---|---|
|  |  | 6 | 7 | 8 | 3 | 4 |
| Cooling speed (°C./hr) | | 50 | 50 | 50 | 50 | 50 |
| Evaluation | Crystallization (%) | 50 | 60 | 35 | 40 | 85 |
|  | Appearance | c | c | c | c | c |
|  | Bending Strength (kg/cm²) | 55 | 60 | 50 | 30 | 85 |
|  | Total Evaluation | c | c | c | x | x |

TABLE 3

|  |  | Examples | | | |
|---|---|---|---|---|---|
|  |  | 9 | 10 | 11 | 12 |
| Inorganic binding materials | Composition (%) B₂O₃ | 45 | 45 | 45 | 45 |
|  | Al₂O₃ | 30 | 30 | 30 | 30 |
|  | CaO | 15 | 15 | 15 | 15 |
|  | MgO | 10 | 10 | 10 | 10 |
|  | Addition amount (%) | 15 | 15 | 15 | 15 |
|  | Form | frit | frit | frit | frit |
| Cooling speed (°C./hr) | | 25 | 30 | 65 | 80 |
| Evaluation | Crystallization (%) | 80 | 75 | 40 | 25 |
|  | Appearance | c | c | c | c |
|  | Bending Strength (kg/cm²) | 65 | 65 | 70 | 70 |
|  | Total Evaluation | Δ | c | c | Δ |

What is claimed is:

1. A filter for aluminum hot melt comprising:
alumina aggregate particles and
an inorganic binder in an amount of 5 to 20 parts by weight bound to 100 parts by weight of said alumina aggregate particles,
said inorganic binder being composed of 15 wt % to 80 wt % of $B_2O_3$, 2 wt % to 60 wt % of $Al_2O_3$, 0 wt % to 30 wt % of CaO and 5 wt % to 50 wt % of MgO, and a peak-height of $9Al_2O_3 \cdot 2B_2O_3$ at $2\theta = 16.5°$ being not less than 30% of a peak-height of $\alpha$-$Al_2O_3$ at $2\theta = 43.4°$ when measured by powder X-ray diffractometry.

2. A filter according to claim 1, wherein said inorganic binder is composed of 30 wt % to 70 wt % of $B_2O_3$, 10 wt % to 45 wt % of $Al_2O_3$, 0 wt % to 25 wt % of CaO and 5 wt % to 25 wt % of MgO, and a peak-height of $9Al_2O_3 \cdot 2B_2O_3$ at $2\theta = 16.5°$ being not less than 35% of a peak-height of $\alpha$-$Al_2O_3$ at $2\theta = 43.4°$ when measured by powder X-ray diffractometry.

3. A filter according to claim 1, wherein said inorganic binder is mixed in a state of frits to said alumina aggregate particles.

4. A filter for aluminum hot melt comprising:
alumina aggregate particles; and
a partially crystalline inorganic binder in an amount of 5 to 20 parts by weight bound to 100 parts by weight of said alumina aggregate particles, said partially crystalline inorganic binder being composed of 15 wt % to 80 wt % of $B_2O_3$, 2 wt % to 60 wt % of $Al_2O_3$, 0 wt % to 30 wt % of CaO and 5 wt % to 50 wt % of MgO;
said filter being produced by a method comprising sintering said filter and then cooling said filter, from a melting temperature of said inorganic binder during sintering, at a cooling rate of not more than 70° C./hr.

5. A filter for aluminum hot melt comprising:
alumina aggregate particles; and
an inorganic binder in an amount of 5 to 20 parts by weight bound to 100 parts by weight of said alumina aggregate particles, said inorganic binder being composed of 15 wt % to 80 wt % of $B_2O_3$, 2 wt % to 60 wt % of $Al_2O_3$, 0 wt % to 30 wt % of CaO and 5 wt % to 50 wt % of MgO, wherein a peak-height of $9Al_2O_3 \cdot 2B_2O_3$ at $2\theta = 16.5°$ is not less than 30% of a peak-height of $\alpha$-$Al_2O_3$ at $2\theta = 43.4°$ when measured by powder X-ray diffractometry;
said filter being produced by a method comprising sintering said filter and then cooling said filter, from a melting temperature of said inorganic binder during sintering, at a cooling rate of not more than 70° C./hr.

* * * * *